US010839403B2

(12) United States Patent
Sundaresan

(10) Patent No.: US 10,839,403 B2
(45) Date of Patent: Nov. 17, 2020

(54) CONTEXTUAL CONTENT PUBLISHING SYSTEM AND METHOD

(75) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 2116 days.

(21) Appl. No.: 11/647,544

(22) Filed: Dec. 28, 2006

(65) Prior Publication Data

US 2008/0162403 A1 Jul. 3, 2008

(51) Int. Cl.
*G06Q 30/00* (2012.01)
*G06Q 30/02* (2012.01)
*G06F 16/335* (2019.01)

(52) U.S. Cl.
CPC ........... *G06Q 30/02* (2013.01); *G06F 16/337* (2019.01); *G06Q 30/0269* (2013.01)

(58) Field of Classification Search
CPC .......... G06Q 30/0207–30/0277; G06F 16/337
See application file for complete search history.

(56) References Cited

U.S. PATENT DOCUMENTS

| | | | |
|---|---|---|---|
| 6,128,663 A * | 10/2000 | Thomas | ........................ 709/228 |
| 6,374,237 B1 | 4/2002 | Reese | |
| 6,542,933 B1 * | 4/2003 | Durst, Jr. | ............ G06F 16/9554 |
| | | | 709/229 |
| 6,901,378 B1 | 5/2005 | Linker et al. | |
| 6,996,768 B1 | 2/2006 | Elo et al. | |
| 7,028,072 B1 | 4/2006 | Kliger et al. | |
| 7,113,921 B2 | 9/2006 | Linker et al. | |
| 7,337,133 B1 * | 2/2008 | Bezos | ................. G06Q 30/0214 |
| | | | 705/14.41 |
| 7,395,514 B2 | 7/2008 | Stern | |
| 7,996,468 B2 * | 8/2011 | Cheah | ................. G06Q 30/0251 |
| | | | 709/204 |
| 2002/0178186 A1 * | 11/2002 | Parry | ..................... G06F 16/958 |
| | | | 705/7.36 |
| 2003/0038840 A1 | 2/2003 | Stern | |
| 2003/0048299 A1 | 3/2003 | Stern | |
| 2003/0158792 A1 | 8/2003 | Perkowski | |

(Continued)

FOREIGN PATENT DOCUMENTS

| | | |
|---|---|---|
| AU | 2007339223 | 12/2011 |
| AU | 2015200085 B2 | 7/2016 |

(Continued)

OTHER PUBLICATIONS

Mummert, Hallie. "Big Ideas . . . ", Target Marketing 28.2, Feb. 2005. (Year: 2005).*

(Continued)

*Primary Examiner* — Michael Bekerman
(74) *Attorney, Agent, or Firm* — Shook, Hardy & Bacon, L.L.P.

(57) ABSTRACT

A method and a system for publishing contextual content. A method and a system maintain user profile information on a user of referrer content associated with a referrer system, the referrer content including a reference to a referee system. The method and system may transmit the user profile information to the referee system in response to the user using the reference to access the referee system. The referee system is to adapt content, presented to a user when accessing the referee system, based on the received user profile information.

30 Claims, 12 Drawing Sheets

(56) References Cited

U.S. PATENT DOCUMENTS

| | | | |
|---|---|---|---|
| 2005/0010475 | A1 | 1/2005 | Perkowski et al. |
| 2005/0044280 | A1 | 2/2005 | Relsman |
| 2005/0060580 | A1 | 3/2005 | Chebolu et al. |
| 2005/0065935 | A1 | 3/2005 | Chebolu et al. |
| 2005/0102201 | A1 | 5/2005 | Linker et al. |
| 2005/0204276 | A1 | 9/2005 | Hosea et al. |
| 2005/0267973 | A1 | 12/2005 | Carlson et al. |
| 2006/0046712 | A1 | 3/2006 | Shamp et al. |
| 2007/0100824 | A1 | 5/2007 | Richardson et al. |
| 2008/0004949 | A1* | 1/2008 | Flake .................. G06F 21/6245 705/14.69 |
| 2009/0234711 | A1* | 9/2009 | Ramer ............... G06Q 30/0269 705/14.66 |
| 2010/0161400 | A1* | 6/2010 | Snodgrass et al. ........ 705/14.16 |

FOREIGN PATENT DOCUMENTS

| | | | |
|---|---|---|---|
| KR | 20000052818 | A | 8/2000 |
| WO | WO-0106441 | A2 | 1/2001 |
| WO | WO-0129742 | A2 | 4/2001 |
| WO | WO-0167285 | A2 | 9/2001 |
| WO | WO-0186493 | A2 | 11/2001 |
| WO | WO-2006110480 | A1 | 10/2006 |
| WO | WO-2006124570 | A2 | 11/2006 |
| WO | WO-2008082598 | A2 | 7/2008 |
| WO | 2008/082598 | A9 | 9/2008 |
| WO | WO-2008082598 | A3 | 12/2009 |

OTHER PUBLICATIONS

"Australian Application Serial No. 2007339223, Response filed Feb. 16, 2011 to Non Final Office Action dated May 19, 2010", 20 pgs.
"European Application Serial No. 07868076.6, Examination Notification Art. 94(3) dated Feb. 24, 2011", 6 pgs.
"European Application Serial No. 07868076.6, Response to EP Search Report Filed Dec. 20, 2010", 4 pgs.
"International Application Serial No. PCT/US2007/026398, International Search Report and Written Opinion dated Oct. 28, 2008", 11 pgs.
"Australian Application Serial No. 2007339223, First Examiner Report dated May 19, 2010", 1 pg.
"European Application Serial No. 07868076.6, Extended European Search Report dated Jun. 7, 2010", 5 pgs.
"Australia Application No. 2007339223—Office Action Response", 13 pgs.
"Australian Application Serial No. 2007339223, Office Action Response filed Jul. 14, 2011", 2 pgs.
"Australian Application Serial No. 2007339223, Subsequent Examiner Report dated Mar. 15, 2011", 2 pgs.
"Australian Application Serial No. 2007339223, Subsequent Examiner Report dated Jun. 15, 2011", 2 pgs.
"European Application Serial No. 07868076.6—Exam Notification Response filed dated Aug. 27, 2011", 6 pgs.
"Korean Aoolication Serial No. 2009-7015678, Office Action dated Mar. 18, 2011", 3 pgs.
"Chinese Application Serial No. 200780051868.2, Office Action dated Jul. 5, 2011", With English Translation, 9 pgs.
"Chinese Application Serial No. 200780051868.2, Decision on Rejection dated Dec. 11, 2012", with English translation of claims, 15 pgs.
"Korean Application Serial No. 2009-7015678, Amendment filed Nov. 29, 2012", with English translation of claims, 60 pgs.
"Korean Application Serial No. 2009-7015678, Decision to Grant dated Nov. 26, 2012", with English translation, 3 pgs.
"Chinese Application Serial No. 200780051868.2, Response filed Nov. 21, 2011 to Office Action dated Jul. 5, 2011", 11 pgs.
"Korean Application No. 2009-7015678, Office Action Response dated Jan. 12, 2012", 20 pgs.
"Korean Application Serial No. 2009-7015678, Office Action dated Nov. 24, 2011", EN Translation Only., 4 pgs.
"Chinese Application Serial No. 200780051868.2, Office Action dated Apr. 20, 2012", with English translation of claims, 16 pgs.
"European Application Serial No. 07868076.6, Decision to Refuse dated Apr. 12, 2012", 15 pgs.
"European Application Serial No. 07868076.6, Summons to Attend Oral Proceedings dated Dec. 20, 2011", 7 pgs.
"International Application Serial No. PCT/US2007/026398, International Preliminary Report on Patentability dated Jul. 9, 2009", 8 pgs.
"International Application Serial No. PCT/US2007/026398, Written Opinion dated Oct. 28, 2008", 5 pgs.
"Korean Application Serial No. 2009-7015678, Final Office Action dated Jun. 29, 2012", with English translation of claims, 6 pgs.
"Korean Application Serial No. 2009-7015678, Response filed May 18, 2011", with English translation of claims, 31 pgs.
"Korean Application Serial No. 2009-7015678, Voluntary Amendment filed Aug. 25, 2009", with English translation of claims, 52 pgs.
"Australian Application Serial No. 2011253699, First Examiner Report dated Apr. 10, 2013", 3 pgs.
"Australian Application Serial No. 2011253699, Subsequent Examiners Report dated Jan. 7, 2015", 3 pgs.
"Australian Application Serial No. 2015200085, Response filed May 20, 2016 to First Examiner Report dated Dec. 23, 2015", 17 pgs.
Examination Report dated Nov. 2, 2017 in Australian Patent Application No. 2016238973, 4 pages.
Response to Examination Report filed on Dec. 16, 2014, for Australian Application No. 2011253699, dated Apr. 10, 2013, 18 pages.
Response to Examination Report filed on Dec. 18, 2017, for Australian Application No. 2016238973, dated Nov. 2, 2017, 12 pages.
Response to Examination Report filed on Jul. 7, 2011, for European Patent Application No. 07868076.6, dated Feb. 24, 2011, 6 pages.
Response to Office Action filed on Oct. 2, 2012, for Korean Patent Application No. 10-2009-7015678, dated Jun. 29, 2012, 20 pages. (14 pages of official copy and 6 pages of English pending claims).
First Examination Report received for Australian Patent Application No. 2015200085, dated Dec. 23, 2015, 3 pages.
Response to Second Examination Report filed on May 18, 2011, for Australian Application No. 2007339223, dated Mar. 15, 2011, 13 pages.
Decision of Rejection received for Chinese patent Application No. 20070051868.2, dated Nov. 1, 2012, 11 pages (4 pages of official copy and 7 pages of English translation).
Response to Office action filed on Sep. 5, 2012, for Chinese Patent Application No. 200780051868.2, dated Apr. 20, 2012, 3 pages (official copy only).

* cited by examiner

CONTEXTUAL CONTENT PUBLISHING SYSTEM AND METHOD

TECHNICAL FIELD

The present application relates generally to the technical field of content publishing and, in one specific example, to contextual advertising within an Internet environment.

BACKGROUND

Contextual advertising has been implemented by a number of content providers to provide users of content pages, e.g., websites, with advertisements that are contextual to the content of the content pages. By providing contextual advertisements over interactive media, such as the Internet, the value of advertisements has been increased.

Various contextual programs, such as AdSense and Microsoft's® adCenter, are presently used on various websites and web pages to provide contextual advertising. AdSense is an advertising serving program run by Google® in which advertisements displayed on a web page are selected in response to a search technology that identifies the web page content, user geographical location and other available information. For example, an advertising serving program may determine that a particular web page relates to animals, e.g., a news article on the rescue of stray dogs. In response to determining the content of the webpage (i.e. animals or dogs), the advertising serving program may then select dog product advertisements to be incorporated into the relevant web page.

Advertisements on web pages may be presented as "banner ads" which is a box placed either on the upper end or to the side of the web page. Banner ads may typically be embedded into a web page and are intended to attract traffic to an advertiser website by linking, through a reference, the banner ad to the website of the advertiser. This process is called "click-through". In circumstances where a user completes a transaction related to a served advertisement or takes the action an advertiser intended the user to take, a "conversion" is said to have occurred. The ratio of the number of conversions to the number of placements of advertisements is generally called the "conversion rate".

Although the present format of contextual advertising has improved advertising click-throughs and may also have improved the conversion rates associated with advertisement placements, content provided to users once a click-through has occurred remains generic, which may negatively impact the conversion rates and the value to be attributed to the advertisements.

BRIEF DESCRIPTION OF THE DRAWINGS

Some embodiments are illustrated by way of example and not limitation in the figures of the accompanying drawings in which.

DETAILED DESCRIPTION

Example methods and systems to publish targeted contextual content are described. In the following description, for purposes of explanation, numerous specific details are set forth in order to provide a thorough understanding of example embodiments. It will be evident, however, to one skilled in the art that the present invention may be practiced without these specific details.

Figure 1:
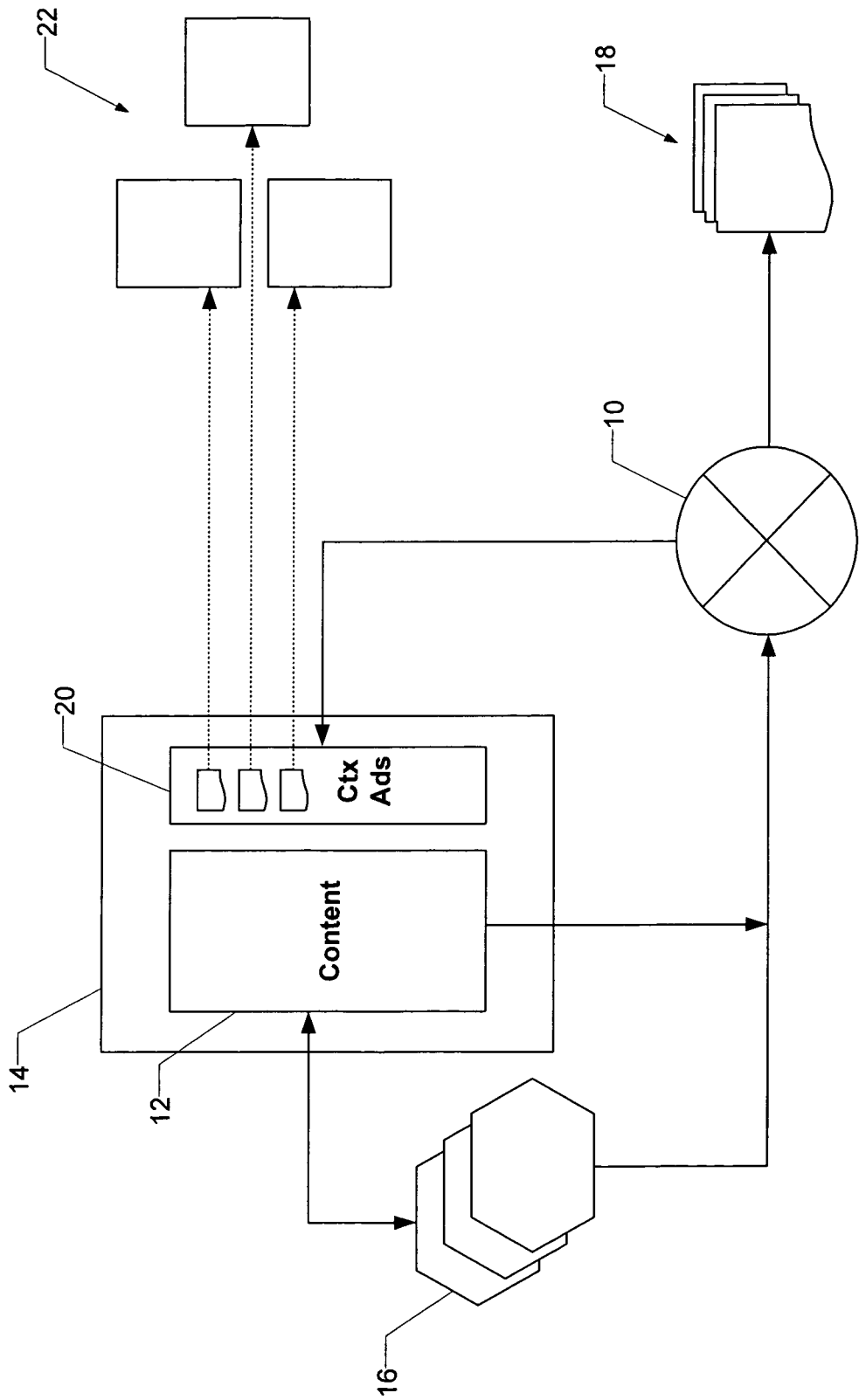
FIG. 1 is a block diagram illustrating content publishing in accordance with certain methods.

FIG. 1 shows a block diagram to illustrate content publishing according to certain methods. As described above, in contextual advertising an advertising serving program or content engine 10 is used to search content 12, typically textual content, provided on a content page 14, e.g., a web page. The advertising serving program 10 may for example index the content of a web page to identify keywords or a theme of the content 12.

User profile information 16 available to the content provider is also fed to the advertising serving program 10. The user profile information 16 may, for example, include details of the age, gender and race of the user, particular interests of the user, other demographic information, past and current behavior associated with the user and particular session information associated with the use of the content page 14 by the user.

Based on the user profile information 16 and the content extracted by the advertising serving program 10, the advertising serving program 10 accesses a database of advertisers 18 and selects various advertisements 20, e.g., banner ads, text ads etc., that are to be incorporated into the content page 14 of the content provider. The advertisements may be selected based on advertisers purchasing certain keywords. Each advertisement 20 is linked via a reference, e.g., by a hypertext link such as a Universal Remote Locator ( ), to the websites 22 of the respective advertiser.

Although the user profile information 16 is used to select the type of advertisement to be placed, the user profile information 16 is not sent to the systems associated with the advertisements. The user profile information 16 is also not used for the selection of the web pages 22 of the advertiser to be displayed, which means that content pages of the advertisers remain static.

Figure 2:
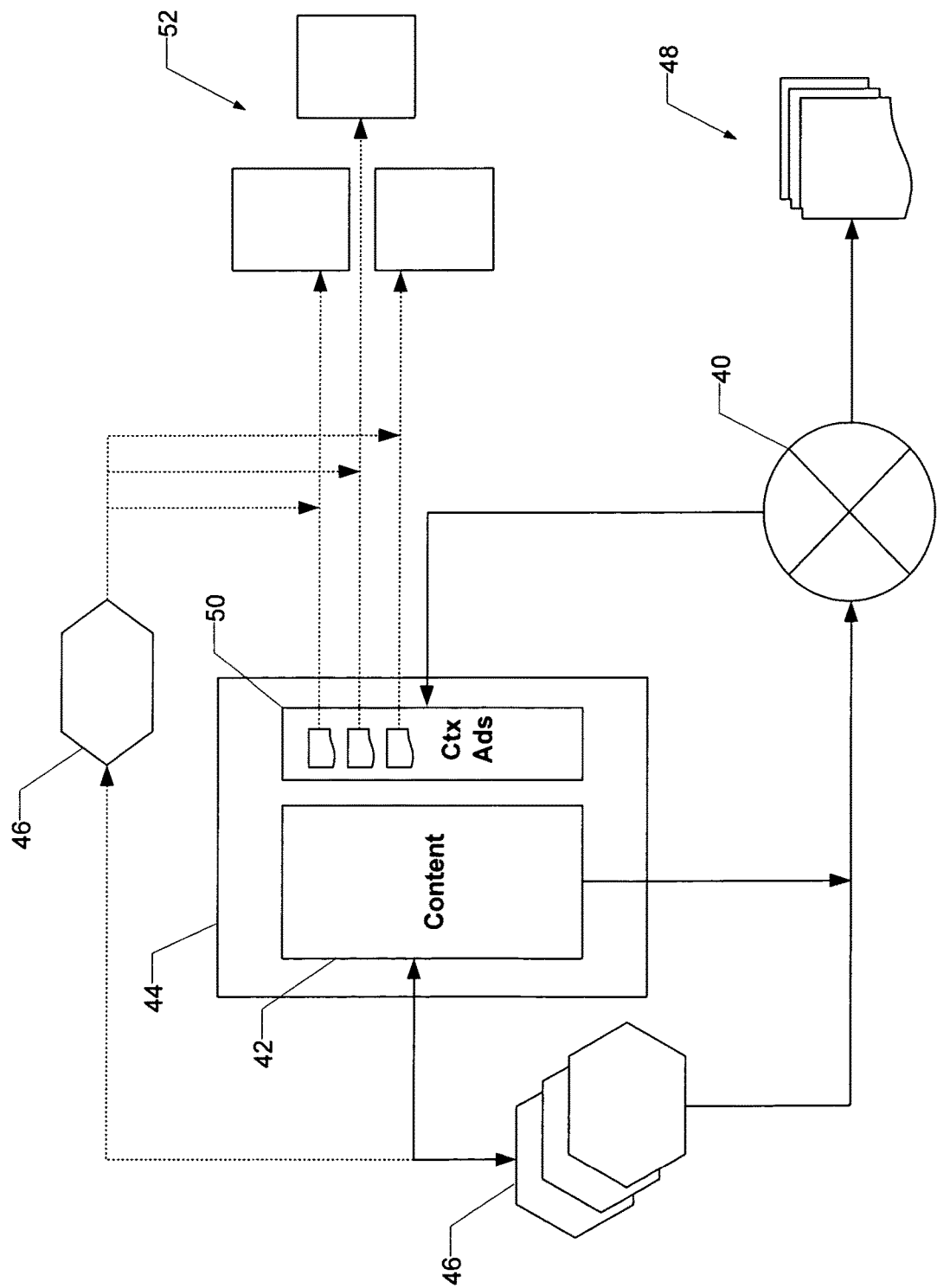
FIG. 2 is a block diagram illustrating content publishing in accordance with an example embodiment.

Turning to FIG. 2, a block diagram to illustrate an example embodiment of content publishing is shown. Similar to the content publishing shown in FIG. 1, a content engine 40 is used to search content 42 provided on a content page 44, e.g., a web page and to index the content 42 of the web page 44 thereby to identify keywords or a theme of the content 42.

As described, user profile information 46 available to the content provider is also fed to the content engine 40. The content engine 40 accesses a database of advertisers 48 or partners and, based on the user profile information 46 and the content extracted by the content engine 40, selects predefined advertisements content 50 (such as banner or text ads) to be incorporated into the content page 44 of the content provider.

The user profile information 46 is also fed back to the systems associated with the advertisers or partners, e.g., referee systems. Each of these systems may adapt content to be displayed to the user, e.g., advertising web pages, based on the received user profile information 46. By adapting the content to be displayed by the advertiser or partner system, one example benefit may be that the conversion rate of the content displayed may increase as the content would be tailored to the profile of the particular user. In effect, the click-through provided by example embodiments is a higher semantic click, as the user is taken to a content page that would be more relevant to the user. This relates to a higher value user for the advertisement or partner system, with the advertisement or partner then being willing to pay a higher amount for every click-through from the content page 44.

Architecture

FIG. 2 is a block diagram illustrating a referrer system 80 and a referee system 82. In one example embodiment, the referrer system 80 may be any type of web server with associated referrer content. For example, the referrer system 80 in the form of a web server may host an Internet website or web page, e.g., a search engine website, a news website, a blog web page or the like. The referrer system 80 may alternatively manage or host referrer content as documents of various file formats, e.g., PDF (Portable Document Format) documents, Microsoft Word documents, Flash content or any text, image, video or audio content. The referee system 82 which is associated with the referrer system 80 may be managed by an advertiser or partner of the referrer, and the referee system 82 may also be a web server with associated referee content. For example, a web server may host other Internet websites or web pages that require advertising through the referrer content (e.g., the websites or web pages) of the referral system 80. Advertising in this context may be seen as an association between referrer content and referee content, the referee content being linked to the referrer content via a reference.

In an example embodiment, the referrer system 80 comprises a content module 84 that is to determine referrer content 104 associated with the referrer system 80. The referrer content 104 may be any content type, such as text, graphics, video, audio, mixed media or any combination thereof presented to the user. The different types of content may form the mentioned referrer website or web page 106, or documents of various file formats, e.g., a PDF document, a Word document, Flash content or the like. The content module 84 accesses a referral content database 86 to access referral content that may be presented to the user.

As mentioned, the referrer content may also include a reference 102 to the referee system 82. This reference may be a hyperlink from a referrer web page 106 to a referee web page 122. In an example embodiment, the hyperlink may be a Uniform Resource Locator (URL).

The referrer system 80 also comprises a referee placement module 88 and a profile module 90, which together and in combination with the content module 84 may determine the references to be published or embedded in the referrer content 104, e.g., the web page 106. The content module 84 may, in an example embodiment, include an advertising serving program (as mentioned in accordance with FIG. 2) which program is used to search the referrer content 104 to be presented to the user. The content module 84 may index the referrer content 104 to identify priority keywords or a theme of the referrer content 104. These keywords or themes are provided to the referee placement module 88.

In turn, the profile module 90 maintains user profile information on a user of the referrer content, e.g., in a user profile database 124, and provides the referee placement module 88 with this user profile information. The user profile information may include personal details of the user, e.g., the age, gender and race of the user, particular interests of the user, behavior associated with the user and session information associated with the user. The personal details of the user may be obtained by the referrer system 80 during a registration or login process. For example, on certain commercial websites such as eBay or on mail websites such as Yahoo Mail, a user needs to register prior to accessing certain content on the websites. This personal information may be stored in the user profile database 124 and may be used by the referrer system 80 to profile the user.

The behavior associated with the user may relate to how often the user visits various referrer content sources of the referrer system, whether the user purchases certain online items or services and the average amount of any purchases. In one example embodiment, a tracking module 92 may record this behavior of the user relating to the referrer content. Session information relating to a particular site visit may also be recorded by the tracking module 92. The referrer system 80 may further include an external data collection module 94 that is to access a third party profile database 96 to obtain additional user profile information.

Once provided with the user profile information and the content, the referee placement module 88 accesses a database of referees 126 (e.g., advertisers or partners) and selects predefined referee content (e.g., various advertisements such as banner or text ads) which is provided to a contextual provider module 98. The referee placement module 88 is accordingly used to select appropriate predefined referee content which is contextual to the referrer content 104. For example, the predefined referee content may include a reference 102 and an advertisements relating to the general theme of content on a website. The reference 102 of the predefined referee content may be used to link the user to the referee content 122 advertised.

In one example embodiment, the contextual provider module 98 may be a JavaScript program that executes different processes to provide the user profile information to the referee system 82. The contextual provider module 98 may add the user profile information to the reference 102 which links the referrer content 104 with the referee content 120.

In an example embodiment, the referee placement module 88 provides a URL to the contextual provider module 98, which may include a URL redirector, which is to create an extended URL. An example of an extended URL is www.e-Bay.com/XYZ wherein XYZ relates to the user profile information. An example of an extended URL is http://www.amazon.com/electronics?gender=m&ageseg=2&conversionconfidence=80, the extended URL according identifying the gender, age segment and a conversion confidence for a referred user.

As mentioned, the referee placement module 88 provides, via the contextual provider module 98, a publisher module 100, e.g. a page server, with references 102 that are to be included with the content information 104 for presentation to the user as, e.g., a web page 106.

The publisher module 100 transmits the user profile information to the referee system 82 in response to the user using the reference to access the referee system. The contextual provider module 98 and the publisher module 100 may, as mentioned, transmit the user profile information as part of an extended URL, through a mark-up language, e.g., as part of a web service using XML and SOAP, or as part of a two-way communication process. In an example embodiment of two-way communication, the referrer system 80 may transmit to the referee system 82 information to inform the referee system 82 that user profile information is available. The referee system 82 may then transmit a request to receive particular user profile information from the referrer system 80, which may respond accordingly.

The publisher module 100 is to publish the extended URL together with the referrer content 104 on a user device. For example, the referrer content 104 may be published as part of the web page 106 on a personal computer, mobile telephone, a Personal Digital Assistant (PDA) or the like. Various URL's forming part of the predefined referrer content on the web page (e.g., advertisements) may link to the referee system 82 associated with referee content 120.

In an example embodiment, the referee system 82 may comprise a user information module 108 which is to receive the user profile information on a user, as transmitted by the referrer system 80. As mentioned above, the user profile information may be sent to the referee system 82 as an extended URL, as part of web service, e.g., a markup language such as XMLs or as part of two way communication between the referrer system 80 and the referee system 82, using appropriate technologies. In accordance with the methods of transmitting the user profile information, the user information module 108 may comprise sub-modules, such as a URL parser 110, to extract the user profile information from the transmission. For example, in the event that the reference 102 is a URL, the user profile information is received by the user information module 108 as an extended URL and the URL parser 110 extracts the user profile information from the extended URL.

The referee system 82 may further comprise a rules engine 112 to apply predefined rules to the received and extracted user profile information. The rules engine 112 then enables a content module 114 to adapt referee content contained in a referee content database 116, based on the received user profile information. This is to ensure that the adapted referee content 120 suits the profile of the user which has accessed the referee content 120 through the use of the reference 102 on the referrer web page 106. The content module 114 adapts the referee content by accessing content information in the content database 116 and selecting the appropriate content based on the user profile information.

In one example embodiment, the referee system 82 includes a publisher module 118 to present the adapted referee content 120 to the user as the web page 122, when the user accesses the referee system 82. As mentioned, the referee content 120 may also be a website or web page, or alternatively, may be other types of documents, e.g., a PDF document, Word document or Flash content.

Data Structures

Figure 4:
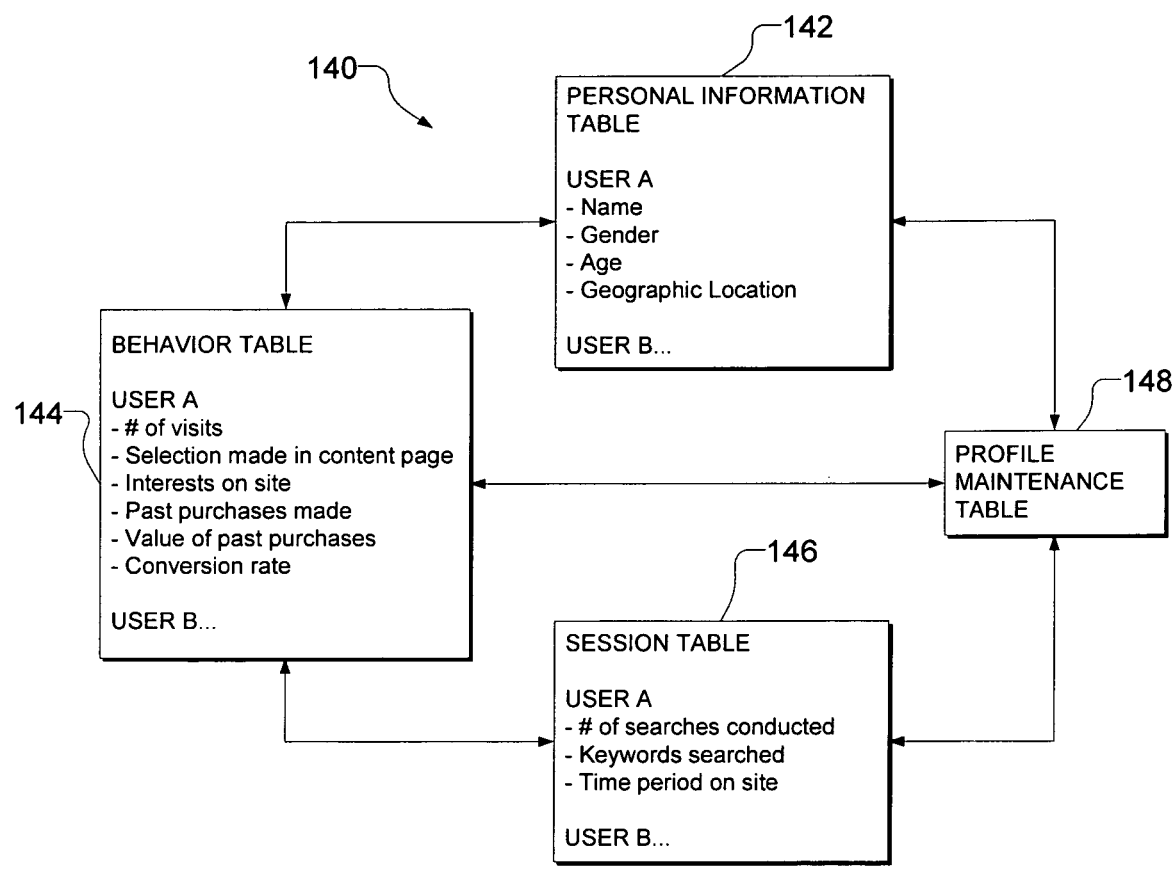
FIG. 4 shows a high-level entity-relationship diagram illustrating tables that may be maintained within a user profile database, in accordance with an example embodiment.

FIG. 4 is a high-level entity-relationship diagram, illustrating various tables 140 that may be maintained within the database 124, and that are utilized by and support the profile module 90, tracking module 92, referee placement module 88 and the contextual provider module 98. For each user of the referrer system 80, information may be stored in the personal information table 142, the behavior table 144, the session table 146 and the profile maintenance table 148. The personal information table 142 may store and maintain the name, gender, age and geographic location of the user. Other information such as the address, e-mail address and other contact details may also be stored in the personal information table 142. As mentioned earlier, this type of information may be captured by the referrer system 80 during a registration or login process.

The behavior table 144 stores and maintains a record of the behavior of the user of the referrer content 104. For example, the behavior information may include details on the number of times a user has visited the referrer content, e.g., the referrer's website 106. The information may further provide a summary of the selections the user has previously made on the website, e.g., particular interests of the user. Information may also be stored on the past purchases made by the user, the value of past purchases and the conversion rate of each visit. It will be appreciated that this information may be very useful to a referee system 82, as the referee system 82 would, for example, know that the user is a high end user with a low conversion rate.

The session table 146 stores and maintains information on a particular session of the user on the referrer content 104. This information may include details of searches that have been conducted on the referrer content 104, such as the number of searches, keywords searched and the period of time the user has spent searching.

The profile maintenance table 148 may maintain and store processed user profile data. For example, the profile module 90 may process the information stored in the personal information table 142, the behavior table 144, the session table 146 and additional information received from the third party profile database 96 and may maintain this data in a predefined format. This processed information may then be provided to the contextual provider module 98 for further transmission to the referee system 82.

Flowcharts

Figure 5:
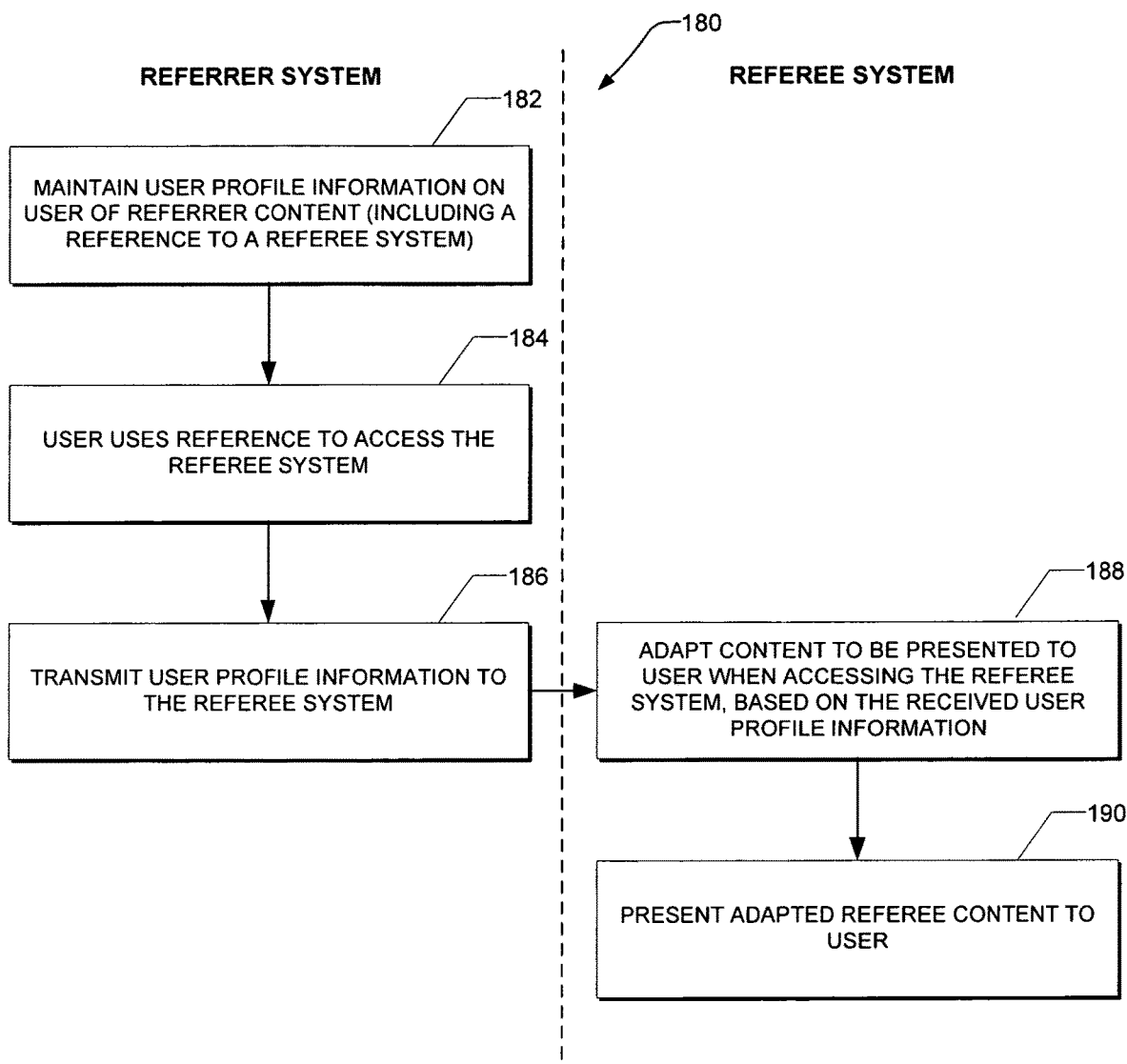
FIG. 5 is a simplified flow diagram of a method in accordance with an example embodiment.

FIG. 5 shows a simplified flow diagram of an example method 180 of contextual content publishing. In one example embodiment, the method 180 may be implemented by the system of FIG. 3, e.g., the referrer system 80. FIG. 5 shows the operations of the method divided between operations executed or performed by the referrer system 80 and operations executed or performed by the referee system 82.

Turning to block 182, a profile module 122 maintains user profile information on a user of referrer content associated with the referrer system 80. The user profile information may be maintained and stored in the user profile database 124, as described in accordance with FIG. 4. In example embodiments, the referrer content 104 may be contained as a website or web page 106, documents of various file formats or the like hosted on a servers, e.g., web servers. The referrer content 104 includes a reference 102 to a referee system 82. The reference 102 may be a hyperlink such as a URL that links a user to referee content provided by the referee system 82.

As shown by block 184, a user uses the reference 102 to access the referee system 82. In one example embodiment, the user clicks or double-clicks the reference 102 or URL and the web browser of a user device then redirects the user to the referee content 120.

When the user uses the reference 102 to access the referee system 82, user profile data of the user maintained by the profile module 90 and stored in the user profile database 124 is transmitted to the contextual provider module 98 and then to the publisher module 100 to be transmitted to the referee system 82 (shown by block 186). This information is used by the referee system 82 to adapt content (see block 188), such as referee content 120 that is to be presented to the user when accessing the referee system 82 (see block 190). The content 120 is adapted based on the received user profile information, thereby to enable the referee system 82 to provide the user with referee content 120 that is tailored to the user's profile.

Figure 6:
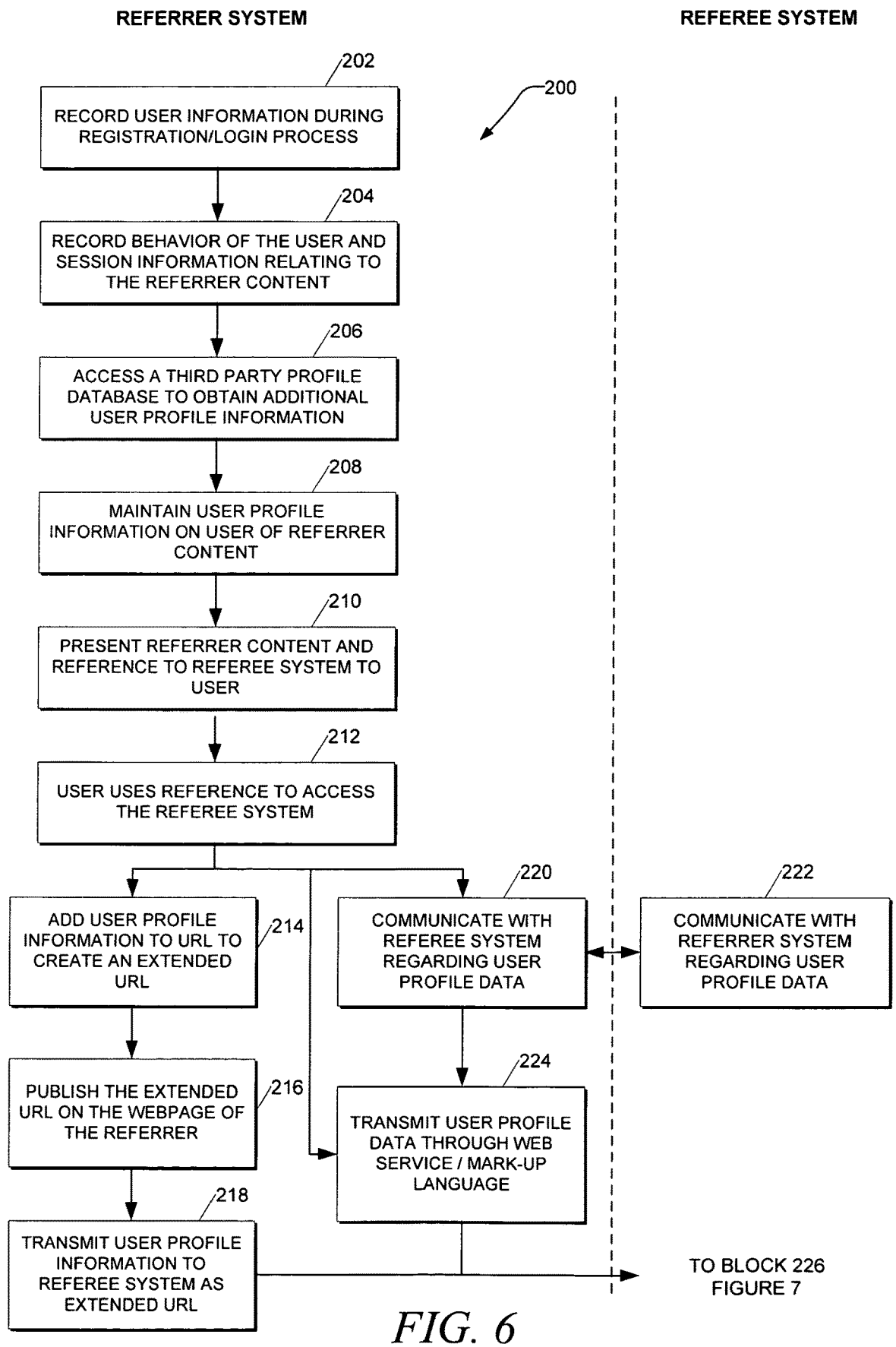
FIGS. 6 and 7 show a detailed flow diagram of the method shown in FIG. 5, in accordance with an example embodiment.
Figure 7:
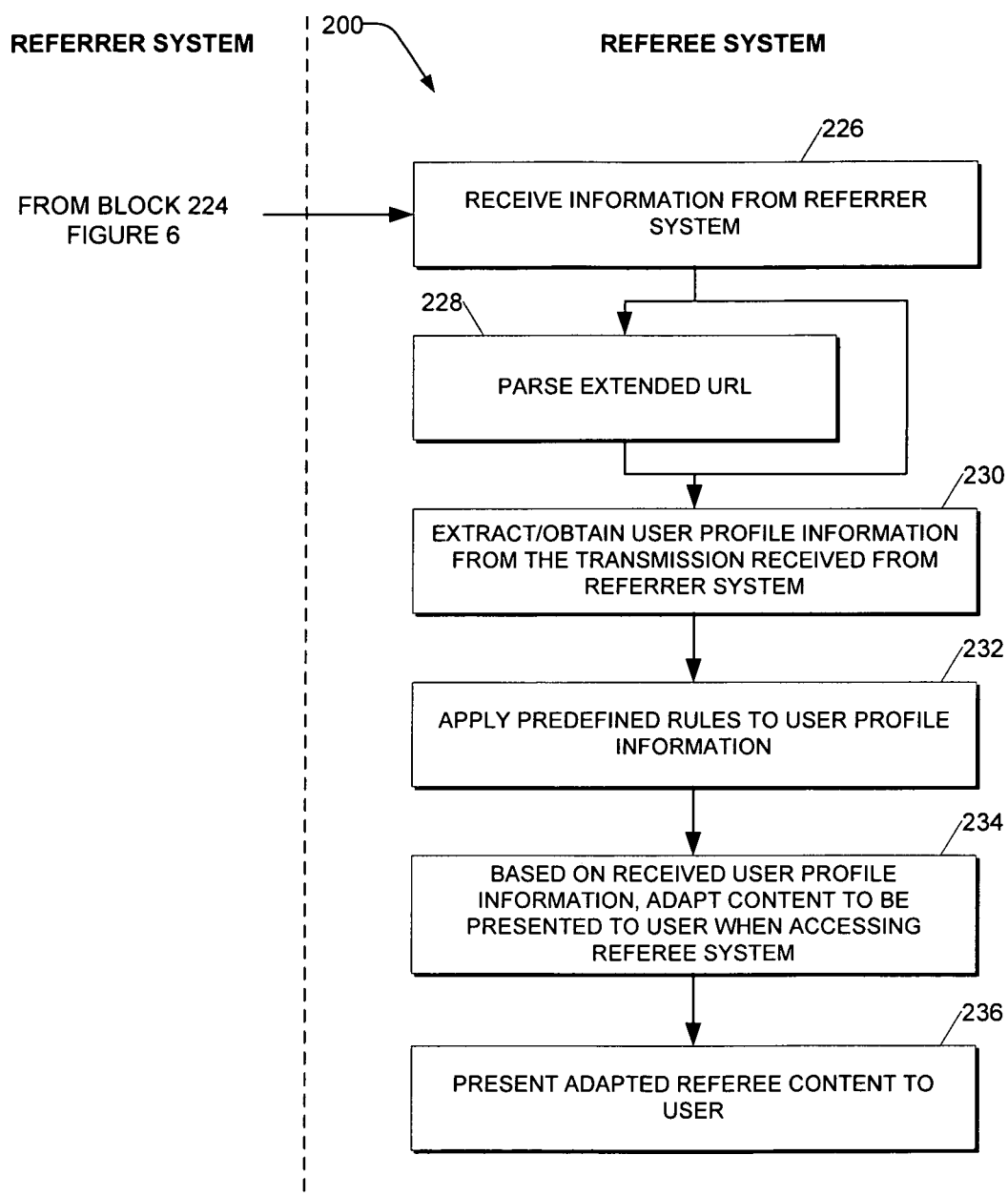

FIGS. 6 and 7 show a more detailed flow diagram of a method 200 of targeted content publishing, in accordance with an example embodiment. This method 200 may also, in one example embodiment, be implemented by the referrer system 80 and referee system 82 of FIG. 3. Similar to FIG. 5, FIGS. 6 and 7 show the operations of the method 200 divided between operations executed or performed by the referrer system 80 and operations executed or performed by the referee system 82.

As shown by block 202, a profile module 90 records user information, e.g., personal details of the user, during a registration or login process. This recording may be a once-off process or alternatively, the profile module 90 may update the user information when necessary. In an example embodiment, this information is stored in the personal information table 142 of the user profile database 124. As mentioned, a registration process may be mandatory to access certain referrer content, e.g., various websites, and provides the referrer system 80 with an opportunity to build a profile for a user.

While a user is browsing the referrer content 104, the profile module 90 and tracking module 92 may record behavior of the user relating to the referrer content (see block 204). This recorded information may be stored in the behavior and session tables 144 and 146 of the user profile database 124 for later use. An external data collection module 94 may also access a third party profile database 96 to obtain additional user profile information (see block 206). As shown by block 208, all of this information may be maintained and processed by the profile module 90 to ensure that an up-to-date record of profile information on any user of the referrer content is maintained.

It will be appreciated that the operations shown by block 202 to 208 may be performed on an ongoing basis, e.g., whenever a user accesses the referrer content 104 through the referrer system 80. However, these operations need not be performed every time a user accesses referrer content and the operations need not be performed during a particular session where user profile information is given through to a referee system 82.

Block 210 indicates that referrer content 104 is presented to a user, together with a reference 102 to the referee system 82. As mentioned, the reference 102 may be a hyperlink, e.g., a URL, that links one website 106 (e.g., the referee content) to another website 122 which is already presented to a user (e.g., the referrer content). The referrer content 104 may alternatively be any type of other document, as described in more detail above. The reference 102 may be preselected by the referee placement module 88 during a process where a referrer content module 84 determines the references to be published or embedded in the referrer content 104 based on the referrer content 104. For example, and as mentioned, the content module 84 may include an advertising serving program which is used to search the referrer content 104 to be presented to the user. The content module 84 may index the referrer content to identify priority keywords or a theme of the referrer content. These keywords or themes are provided to the referee placement module 88.

In turn, the profile module 90 provides the referee placement module 88 with user profile information, which is used by the referee placement module 88, together with the content data to select the predefined referee content (e.g., various advertisements such as banner ads) which is provided to a contextual provider module 98.

Similar to the operation shown by block 184 of FIG. 5, the user uses the reference 102 to access the referee system 82 (shown by block 212). In one example embodiment, the user clicks the reference 102 or URL and the web browser of the user device then redirects to referee content 122.

When the user uses the reference 102 to access the referee system 82, user profile data of the user maintained by the profile module 90 is transmitted to the referee system 82 (shown respectively by blocks 218 and 224). Depending on the formats and technologies used, the user profile data may be transmitted to the referee system 82 in various ways. For example, in one embodiment the reference 102 is a URL that is selected by the referee placement module 88. In this scenario, the contextual provider module 98 in the form of a URL redirector is provided with the reference or URL to the referee system 82, as well as the relevant user profile information. The URL redirector adds the user profile information to the URL to create an extended URL (see block 214), which is published, shown by block 216, with the referrer content, and is to be transmitted to the referee system 82 as the extended URL (see block 218).

Alternatively, and as shown by block 220, the referrer system 80 may communicate with the referee system 82 to advise the referee system 82 that certain user profile information relating to a user is available. In turn, the referee system 82 may request only the user profile information it is able to process or use (see block 222), which user profile information is then transmitted to the referee system (see block 224).

Turning to block 226 of FIG. 7, the user information module 108 of the referee system 82 receives the transmission of the referrer system 80. In the event that the information is transmitted as a URL, a URL parser 110 of the user information module 108 parses the extended URL to obtain the user profile information (see block 228 and block 230).

In the event that the information is sent as part of a web service and/or markup language such as XML, the user information module 108 may extract and obtain the user profile information from the original transmission received from the referrer system 80 (see block 230).

As shown by block 232, the rules engine 112 of the referee system 82 applies predefined rules to the extracted user profile information which may be used to obtain user content data. The user content data may be used by the content module 114 to adapt content obtained from the referee content database 116 (see block 234). The content module 114 bases the selection of the adapted content on the profile of the user, thereby to provide information contextual to the profile of the user in the referee content or web page 122. Block 236 indicates that the adapted content 120 is presented to the user as part of the referee content 122 (e.g., a web page).

User Interfaces

Figure 8:
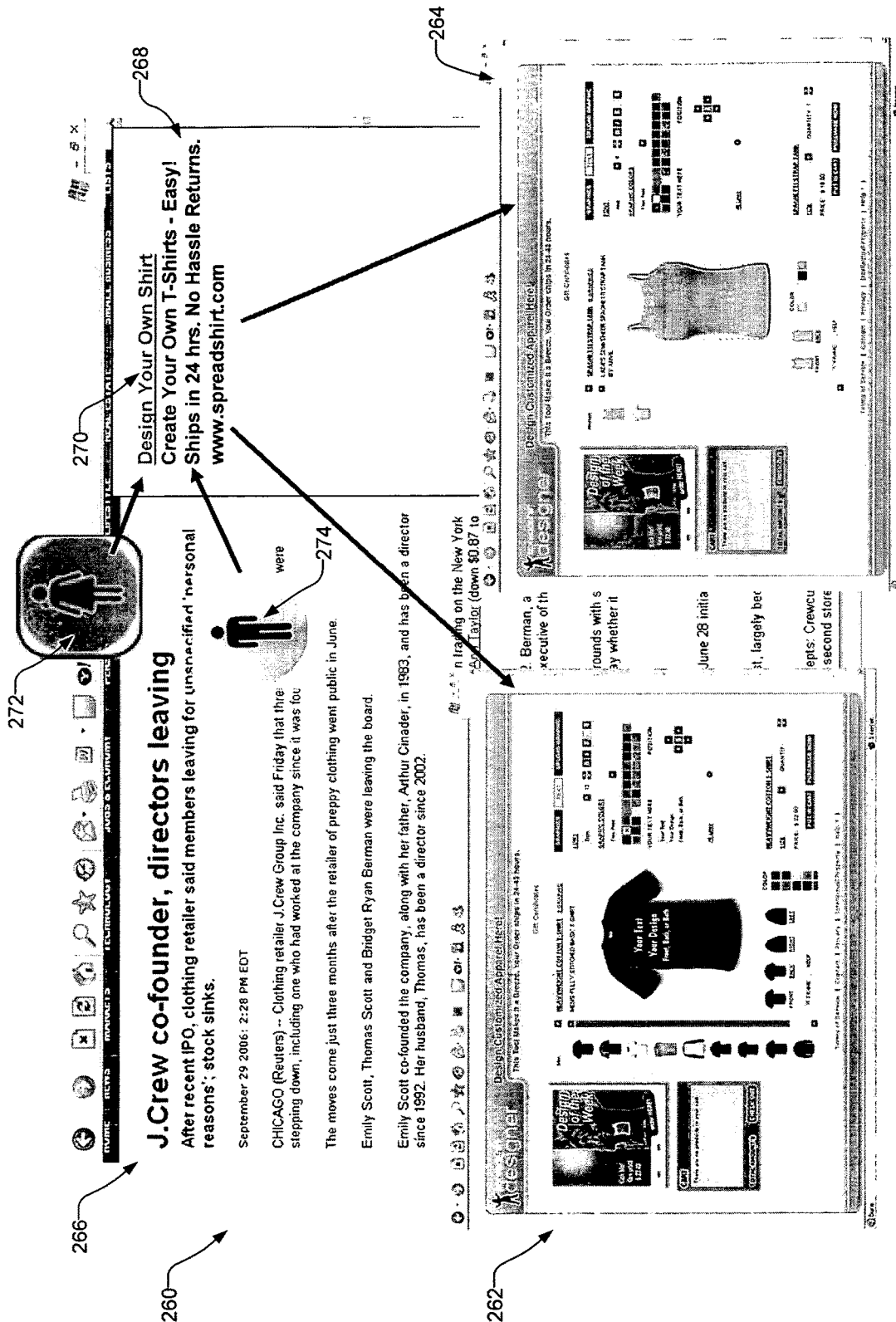
FIG. 8 shows a representation of example embodiments where two different web pages are generated in accordance with an example embodiment.

FIG. 8 shows a representation 260 of example embodiments where two different web pages 262 and 264 have been generated in accordance with an example embodiment. The two different web pages 262 and 264 may have been generated, in one example embodiment, by the referrer system 80 and referee system 82 shown in FIG. 3.

In this example embodiment, the referrer system 80 has generated and presented referrer content in the form of a web page 266 to a user. The web page 266 is a Reuters news article on clothing retailer J. Crew. As described above, the referrer system 80 may have indexed the content of the web page to produce a keyword or theme such as "clothing". This keyword may have been used to determine or select a reference 268 to a referee system. The reference is in the form of a text ad and includes a hyperlink in the form of a URL to transfer the user to a web page of the referee system 82. In this example embodiment, the referee system 82 relates to a website that markets the design of apparel, such as T-Shirts.

In the event that the user uses the reference 268 and in particular the URL 270 to link to the referee system 82, the referrer system 80 transmits user profile information to the referee system 82.

In one example embodiment, the user profile information indicates that the user is female (see reference numeral 272). In this instance, the referee system 82 adapts referee content to suit the profile of the user. As shown by the example of the web page 264, the referee content has been adapted to show a feminine T-Shirt in the color pink. In contrast, if the user profile information indicates that the user is male (see reference numeral 274), the referee system 82 adapts the referee content to suit the profile of the male. As shown by the example of the web page 262, the referee content has been adapted to a masculine T-Shirt in black.

Platform Architecture

Figure 9:
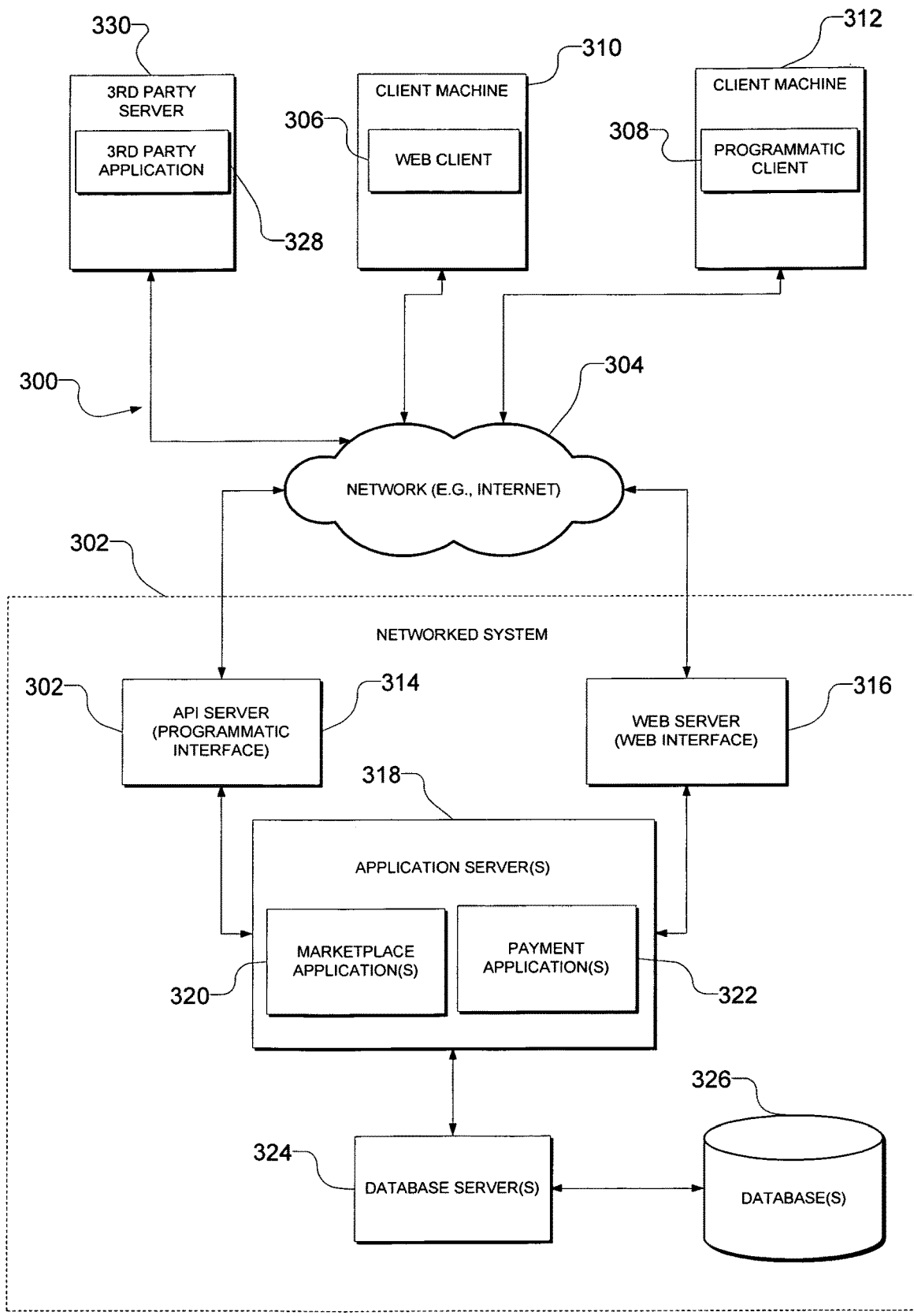
FIG. 9 is a schematic block diagram of a system which may incorporate the referrer system illustrated by FIG. 3, in accordance with an example embodiment.

FIG. 9 is a network diagram depicting a client-server system 300, within which one example embodiment may be deployed. A networked system 302, in the example forms of a network-based marketplace or publication system, provides server-side functionality, via a network 304 (e.g., the Internet or Wide Area Network (WAN)) to one or more clients. FIG. 9 illustrates, for example, a web client 306 (e.g., a browser, such as the Internet Explorer browser developed by Microsoft Corporation of Redmond, Wash.), and a programmatic client 308 executing on respective client machines 310 and 312.

Figure 3:
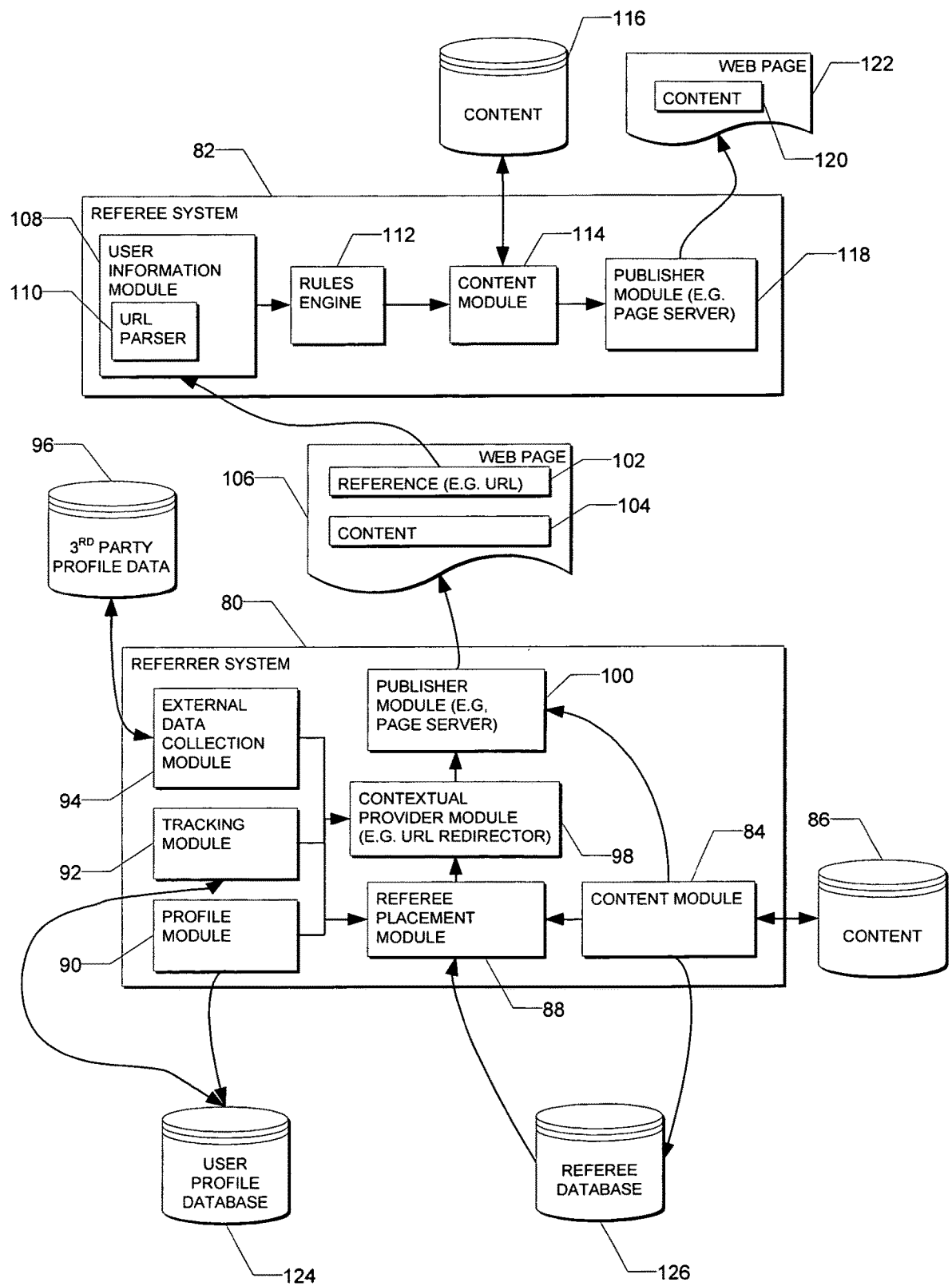
FIG. 3 is a block diagram of a referrer system and a referee system, in accordance with an example embodiment.

An Application Program Interface (API) server 314 and a web server 316 are coupled to, and provide programmatic and web interfaces respectively to, one or more application servers 318. The referrer system 80 as shown in FIG. 3 may, in one example embodiment, form part of the application servers 318. The application servers 318 host one or more marketplace applications 320 and payment applications 322. The application servers 318 are, in turn, shown to be coupled to one or more databases servers 324 that facilitate access to one or more databases 326. The databases related to the referrer system 80, e.g., the user profile database 124, the referee database 126 and the referrer content database 86, may all form part of the databases 326.

The marketplace applications 320 may provide a number of marketplace functions and services to users that access the networked system 302. The payment applications 322 may likewise provide a number of payment services and functions to users. The payment applications 322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 320. While the marketplace and payment applications 320 and 322 are shown in FIG. 9 to both form part of the networked system 302, it will be appreciated that, in alternative embodiments, the payment applications 322 may form part of a payment service that is separate and distinct from the networked system 302.

Further, while the system 300 shown in FIG. 9 employs a client-server architecture, the present invention is of course not limited to such an architecture, and could equally well find application in a distributed, or peer-to-peer, architecture system, for example. The various marketplace and payment applications 320 and 322 could also be implemented as standalone software programs, which do not necessarily have networking capabilities.

The web client 306 accesses the various marketplace and payment applications 320 and 322 via the web interface supported by the web server 316. Similarly, the programmatic client 308 accesses the various services and functions provided by the marketplace and payment applications 320 and 322 via the programmatic interface provided by the API server 314. The programmatic client 308 may, for example, be a seller application (e.g., the TurboLister application developed by eBay Inc., of San Jose, Calif.) to enable sellers to author and manage listings on the networked system 302 in an off-line manner, and to perform batch-mode communications between the programmatic client 308 and the networked system 302.

FIG. 9 also illustrates a third party application 328, executing on a third party server machine 330, as having programmatic access to the networked system 302 via the programmatic interface provided by the API server 314. For example, the third party application 328 may, utilizing information retrieved from the networked system 302, support one or more features or functions on a website hosted by the third party. The third party website may, for example, provide one or more promotional, marketplace or payment functions that are supported by the relevant applications of the networked system 302.

It will be appreciated that either the client machines 310 and 312 or the third party server 330 may, in one example embodiment, operate as the referee system 82 described in accordance with FIG. 3.

Marketplace Applications

Figure 10:
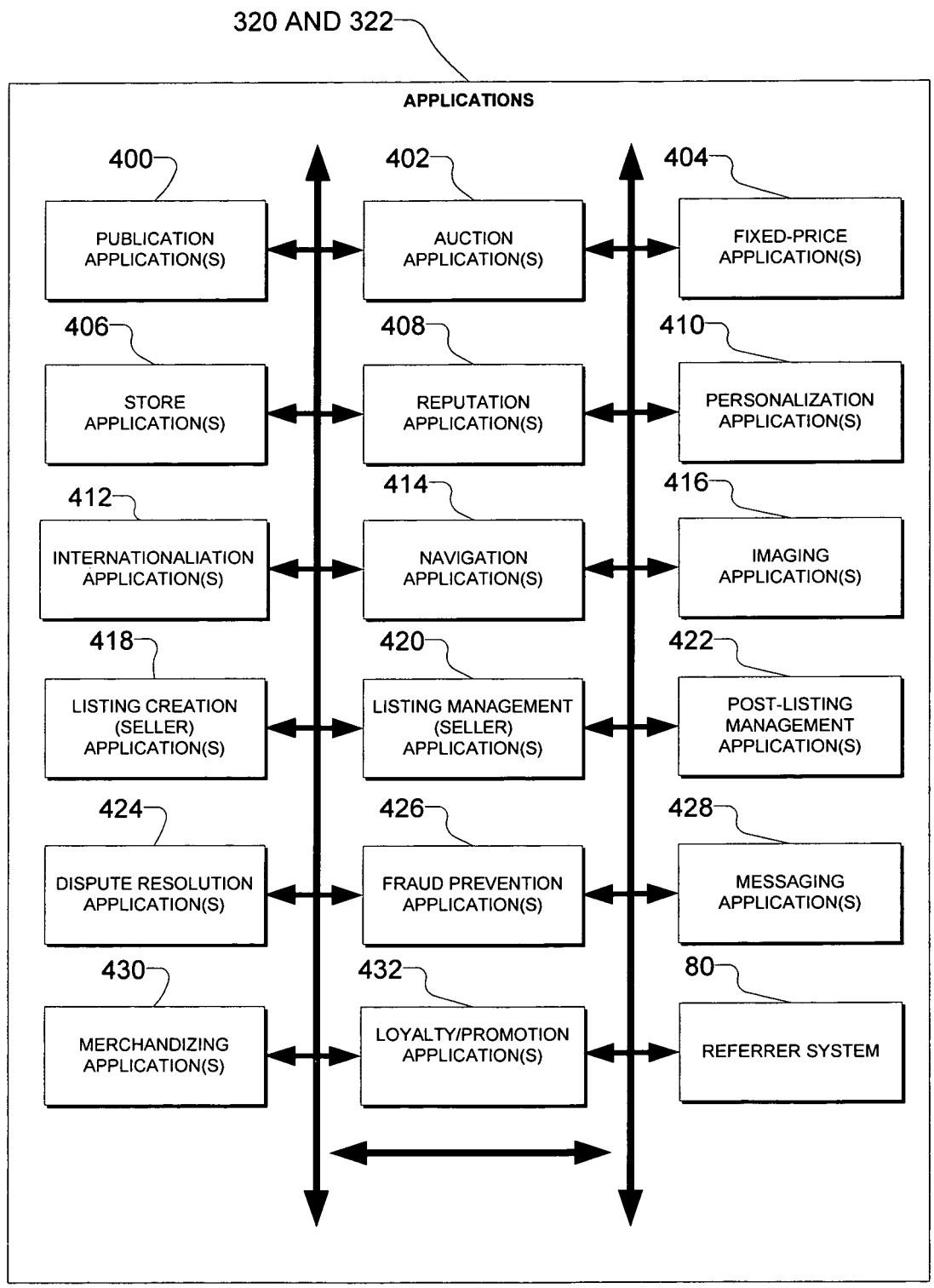
FIG. 10 is a block diagram illustrating multiple applications and modules that, in one example embodiment, form part of the system of FIG. 9.

FIG. 10 is a block diagram illustrating multiple applications 320 and 322 that, in one example embodiment, are provided as part of the networked system 302. The applications 320 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 326 via the database servers 328.

The networked system 302 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 320 are shown to include at least one publication application 400 and one or more auction applications 402 which support auction-format listing and price setting mechanisms (e.g., English, Dutch, Vickrey, Chinese, Double, Reverse auctions etc.). The various auction applications 402 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 404 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 406 allow a seller to group listings within a "virtual" store, which may be branded and otherwise personalized by and for the seller. Such a virtual store may also offer promotions, incentives and features that are specific and personalized to a relevant seller.

Reputation applications 408 allow users that transact, utilizing the networked system 302, to establish, build and maintain reputations, which may be made available and published to potential trading partners. Consider that where, for example, the networked system 302 supports person-to-person trading, users may otherwise have no history or other reference information whereby the trustworthiness and credibility of potential trading partners may be assessed. The reputation applications 408 allow a user, for example through feedback provided by other transaction partners, to establish a reputation within the networked system 302 over time. Other potential trading partners may then reference such a reputation for the purposes of assessing credibility and trustworthiness.

Personalization applications 410 allow users of the networked system 302 to personalize various aspects of their interactions with the networked system 302. For example a user may, utilizing an appropriate personalization application 410, create a personalized reference page at which information regarding transactions to which the user is (or has been) a party may be viewed. Further, a personalization application 410 may enable a user to personalize listings and other aspects of their interactions with the networked system 302 and other parties.

The networked system 302 may support a number of marketplaces that are customized, for example, for specific geographic regions. A version of the networked system 302 may be customized for the United Kingdom, whereas another version of the networked system 302 may be customized for the United States. Each of these versions may operate as an independent marketplace, or may be customized (or internationalized) presentations of a common underlying marketplace. The networked system 302 may accordingly include a number of internationalization applications 412 that customize information (and/or the presentation of information) by the networked system 302 according to predetermined criteria (e.g., geographic, demographic or marketplace criteria). For example, the internationalization applications 412 may be used to support the customization of information for a number of regional websites that are operated by the networked system 302 and that are accessible via respective web servers 316.

Navigation of the networked system 302 may be facilitated by one or more navigation applications 414. For example, a search application (as an example of a navigation application) may enable key word searches of listings published via the networked system 302. A browse application may allow users to browse various category, catalogue, or inventory data structures according to which listings may be classified within the networked system 302. Various other navigation applications may be provided to supplement the search and browsing applications.

In order to make listings, available via the networked system 302, as visually informing and attractive as possible, the marketplace applications 320 may include one or more imaging applications 416 utilizing which users may upload images for inclusion within listings. An imaging application 416 also operates to incorporate images within viewed listings. The imaging applications 416 may also support one or more promotional features, such as image galleries that are presented to potential buyers. For example, sellers may pay an additional fee to have an image included within a gallery of images for promoted items.

Listing creation applications 418 allow sellers conveniently to author listings pertaining to goods or services that they wish to transact via the networked system 302, and listing management applications 420 allow sellers to manage such listings. Specifically, where a particular seller has authored and/or published a large number of listings, the management of such listings may present a challenge. The listing management applications 420 provide a number of features (e.g., auto-relisting, inventory level monitors, etc.) to assist the seller in managing such listings. One or more post-listing management applications 422 also assist sellers with a number of activities that typically occur post-listing. For example, upon completion of an auction facilitated by one or more auction applications 402, a seller may wish to leave feedback regarding a particular buyer. To this end, a post-listing management application 422 may provide an interface to one or more reputation applications 408, so as to allow the seller conveniently to provide feedback regarding multiple buyers to the reputation applications 408.

Dispute resolution applications 424 provide mechanisms whereby disputes arising between transacting parties may be resolved. For example, the dispute resolution applications 424 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 426 implement fraud detection and prevention mechanisms to reduce the occurrence of fraud within the networked system 302.

Messaging applications 428 are responsible for the generation and delivery of messages to users of the networked system 302, such messages for example advising users regarding the status of listings at the networked system 302 (e.g., providing "outbid" notices to bidders during an auction process or to provide promotional and merchandising information to users). Respective messaging applications 428 may utilize any one have a number of message delivery networks and platforms to deliver messages to users. For example, messaging applications 428 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 430 support various merchandising functions that are made available to sellers to enable sellers to increase sales via the networked system 302. The merchandising applications 80 also operate the various merchandising features that may be invoked by sellers, and may monitor and track the success of merchandising strategies employed by sellers.

The networked system 302 itself, or one or more parties that transact via the networked system 302, may operate loyalty programs that are supported by one or more loyalty/promotions applications 432. For example, a buyer may earn loyalty or promotions points for each transaction established and/or concluded with a particular seller, and be offered a reward for which accumulated loyalty points can be redeemed.

As mentioned, the referrer system 80 may also form part of the applications 320 and 322. The referrer system 80 is to transmit relevant user data through to third party servers 330 or client machines 310 and 312 forming part of a referee system 82. This enables the referee system 82 to publish contextual content whenever a user uses a reference from referrer content to link to the referee content.

Data Structures

Figure 11:
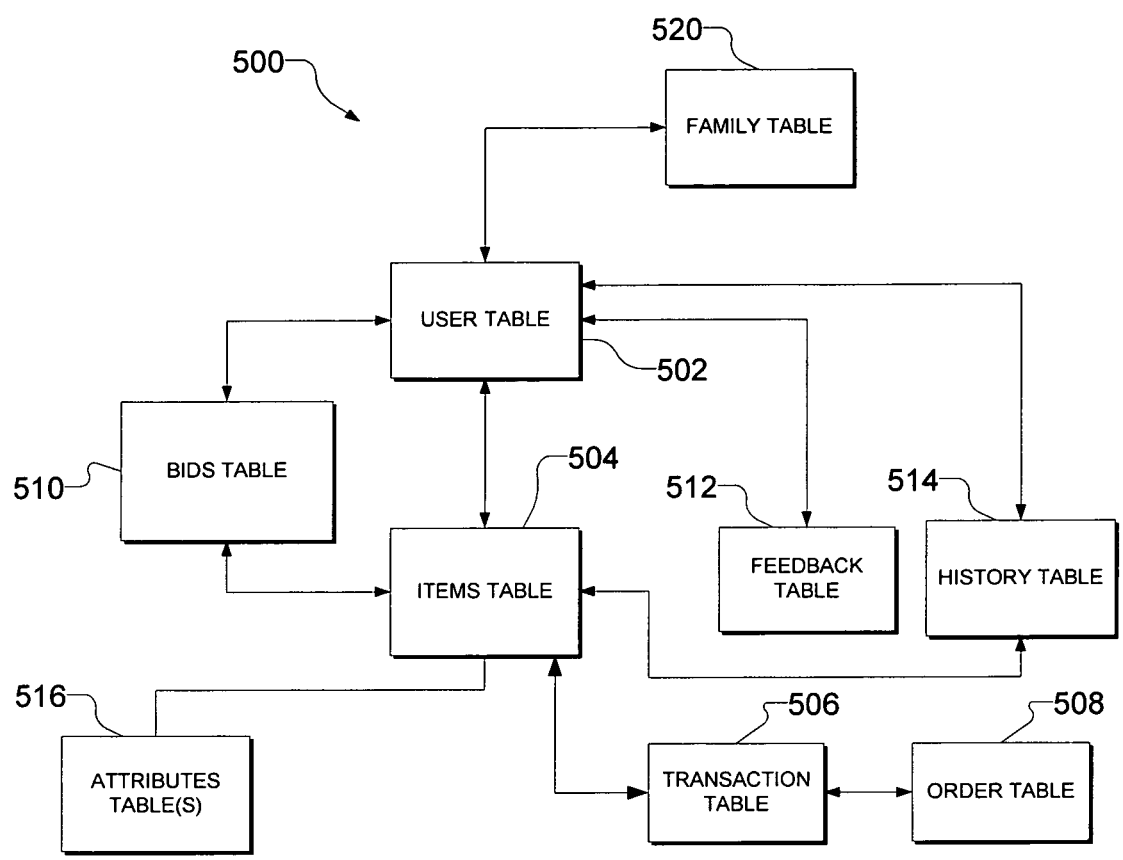
FIG. 11 shows a high-level entity-relationship diagram illustrating tables that may be maintained within a challenge data database, in accordance with an example embodiment.

FIG. 11 is a high-level entity-relationship diagram, illustrating various tables 500 that may be maintained within the databases 326, and that are utilized by and support the applications 320 and 322. A user table 502 contains a record for each registered user of the networked system 302, and may include identifier, address and financial instrument information pertaining to each such registered user. A user may operate as a seller, a buyer, or both, within the networked system 302. In one example embodiment, a buyer may be a user that has accumulated value (e.g., commercial or proprietary currency), and is accordingly able to exchange the accumulated value for items that are offered for sale by the networked system 302.

The tables 500 also include an items table 504 in which are maintained item records for goods and services that are available to be, or have been, transacted via the networked system 302. Each item record within the items table 504 may furthermore be linked to one or more user records within the user table 502, so as to associate a seller and one or more actual or potential buyers with each item record.

A transaction table 506 contains a record for each transaction (e.g., a purchase or sale transaction) pertaining to items for which records exist within the items table 504.

An order table 508 is populated with order records, each order record being associated with an order. Each order, in turn, may be with respect to one or more transactions for which records exist within the transaction table 506.

Bid records within a bids table 510 each relate to a bid received at the networked system 302 in connection with an auction-format listing supported by an auction application 402. A feedback table 512 is utilized by one or more reputation applications 408, in one example embodiment, to construct and maintain reputation information concerning users. A history table 514 maintains a history of transactions to which a user has been a party. One or more attributes tables 516 record attribute information pertaining to items for which records exist within the items table 504. Considering only a single example of such an attribute, the attributes tables 516 may indicate a currency attribute associated with a particular item, the currency attribute identifying the currency of a price for the relevant item as specified in by a seller.

In an example embodiment of the invention, the tables 140 described in accordance with FIG. 4, e.g., the personal information table 142, behavior table 144, session table 146 and profile maintenance table 148 may all be subsidiary tables of the tables 500 of FIG. 11. Alternatively, these tables may be separate tables or may be formed by different records in the tables 500 being appropriately interlinked.

Figure 12:
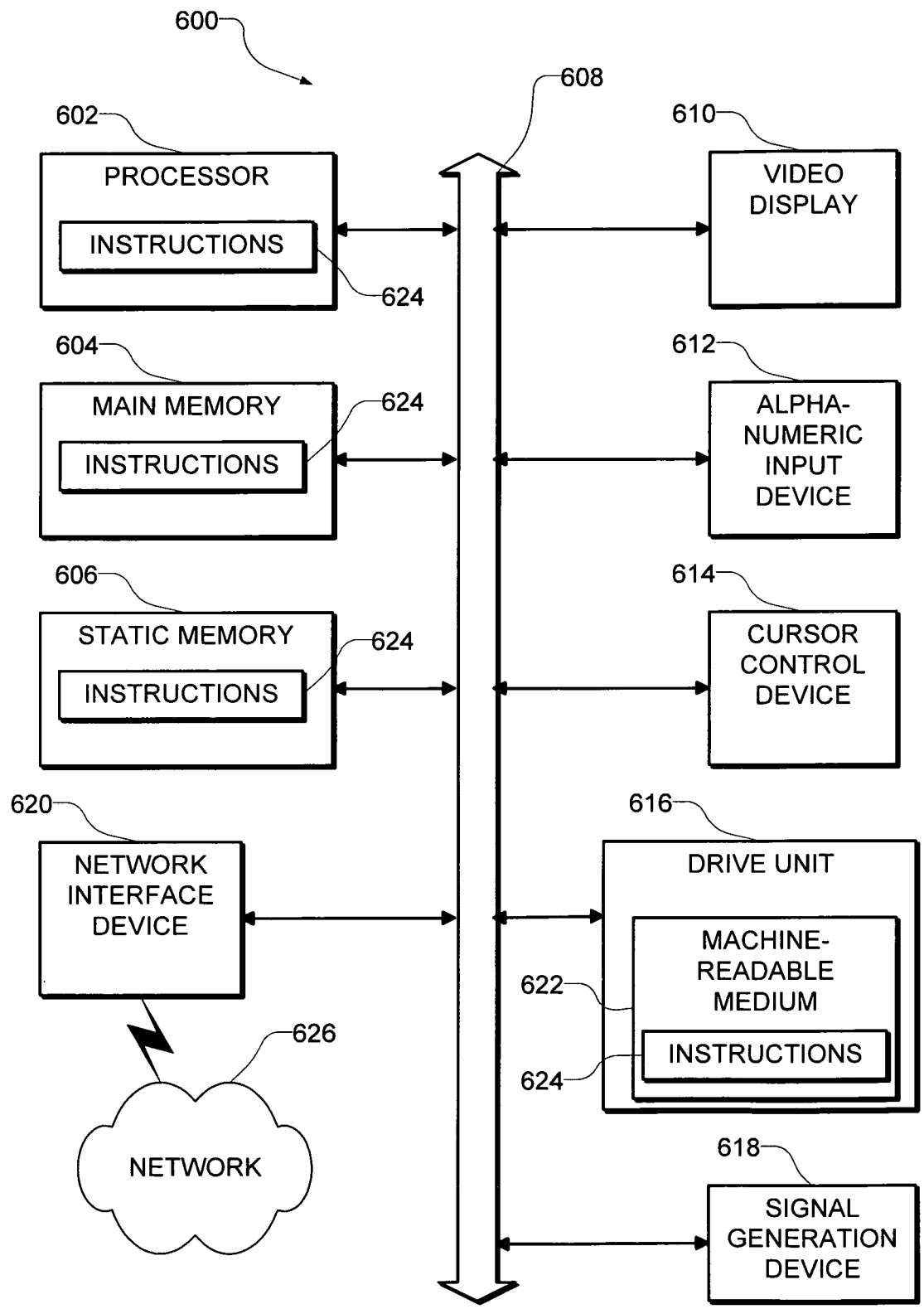
FIG. 12 is a block diagram showing a machine for performing any one of the example methods described herein.

FIG. 12 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term, "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to publish contextual content have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a content module comprising one or more processor devices configured to identify referrer content published by a referrer system to a user, the referrer content including a reference to a referee system;
a profile module comprising at least one computer processor configured to
collect user profile information about the user,
cause communication of a user profile availability indication from the referrer system to the referee system to indicate availability of the user profile information for the user, and
receive a communication from the referee system in response to the user profile availability indication, the communication indicating particular user profile information that is to be transmitted to the referee system;
a contextual provider module implemented by one or more computer processors configured to generate an extended universal resource locator (extended URL) based on the reference and including the particular user profile information indicated by the communication from the referee system; and
a publisher module comprising one or more computer processor devices configured to transmit the extended URL to the referee system in response to a selection of the reference by the user.

2. The system of claim 1, wherein the publisher module is to publish the extended URL with the referrer content on a user device.

3. The system of claim 1, wherein the reference is a hyperlink.

4. The system of claim 1, wherein the referrer content is a website, web page or document.

5. The system of claim 1, further including a tracking module to record behavior of the user relating to the referrer content.

6. The system of claim 1, further including an external data collection module to access a third party profile database to obtain additional user profile information collected by the third party profile database, the third party profile database being separate from the referrer system, the referee system, and the user.

7. The system of claim 1, wherein the extended URL comprises a path and a query string, the particular user profile information indicated in the query string.

8. The system of claim 1, wherein the particular user profile information includes demographic information about the user.

9. The system of claim 8, wherein the demographic information about the user is indicated in a query string in the extended URL.

10. The system of claim 8, wherein the extended URL comprises a path and a query string, the demographic information about the user indicated in the query string.

11. The system of claim 8, wherein the contextual provider module is configured to indicate the demographic information about the user in a query string in the extended URL.

12. A system comprising:
a user information module comprising at least one computer processor configured to:
receive from a referrer system a user profile availability indication that indicates availability of user profile information for a user to whom referrer content including a reference to a referee system is published,
in response to the user profile availability indication, transmit to the referrer system a communication indicating particular personal details from the user profile information that are to be transmitted to the referee system, and
receive an extended universal resource locator (extended URL) containing the particular personal details about the user, the referrer content including the extended URL of a referee system;
a URL parser comprising one or more processors configured to extract the particular personal details about the user from the extended URL;
a content module configured to adapt referee content based on the received particular personal details; and
a publisher module configured to present the adapted referee content to the user when the user accesses the referee system.

13. The system of claim 12, further comprising a rules engine to apply predefined rules to the received particular personal details to enable the content module to adapt the content to suit the user.

14. The system of claim 12, wherein the particular personal details about the user are received as part of a markup language.

15. The system of claim 12, wherein the particular personal details include demographic information about the user.

16. A method comprising:
collecting user profile information about a user of referrer content published by a referrer system, the referrer content including a reference to a referee system;
causing communication of a user profile availability indication from the referrer system to the referee system to indicate availability of the user profile information for the user;
receiving from the referee system a communication in response to the user profile availability indication, the communication indicating particular user profile information that is to be transmitted to the referee system;
in an automated operation performed using one or more processors configured therefor, generating an extended universal resource locator (extended URL) based on the reference and including the particular user profile information indicated by the communication from the referee system; and
transmitting the extended URL to the referee system in response to a selection of the reference by the user.

17. The method of claim 16, wherein the reference is a hyperlink.

18. The method of claim 16, wherein the referrer content is a website, a web page or document.

19. The method of claim 16, further including parsing the extended URL at the referee system to obtain the particular user profile information.

20. The method of claim 19, further including applying predefined rules to the user profile information to obtain user content data and, based on the user content data, adapting referee content published by the referee system.

21. The method of claim 16, wherein maintaining user profile information about the user includes recording viewing behavior between the user and the referrer content.

22. The method of claim 16, wherein maintaining user profile information about the user includes accessing a third party profile database to obtain additional user profile information collected on the third party profile database, the third party profile database being separate from the referrer system, the referee system, and the user.

23. A system comprising:
 means for identifying referrer content published by a referrer system to a user, the referrer content including a reference to a referee system;
 means for collecting user profile information about the user;
 means for causing communication of a user profile availability indication from the referrer system to the referee system to indicate availability of the user profile information for the user;
 means for receiving a communication from the referee system in response to the user profile availability indication, the communication indicating particular user information that is to be transmitted to the referee system;
 means for generating an extended universal resource locator (extended URL) based on the reference and including the particular user profile information indicated by the communication from the referee system; and
 means for transmitting the extended URL to the referee system in response to a selection of the reference by the user.

24. A system comprising:
 means for receiving from a referrer system a user profile availability indication that indicates availability of user profile information for a user to whom referrer content including a reference to a referee system is published;
 means for transmitting to the referrer system, in response to the user profile availability indication, a communication indicating particular personal details from the user profile information that are to be transmitted to the referee system;
 means for receiving an extended universal resource locator (extended URL) containing the particular personal details about the user, the referrer content including the extended URL of a referee system;
 means for extracting the particular personal details about the user from the extended URL;
 means for adapting the referee content based on the received particular personal details; and
 means for presenting the adapted referee content to the user when the user accesses the referee system.

25. The system of claim 24, further comprising means for applying predefined rules to the received particular personal details to enable adapting the content to suit the user.

26. A non-transitory machine-readable medium embodying a set of instructions executable by one or more processors to cause the machine to perform operations comprising:
 collecting user profile information about a user of referrer content published by a referrer system, the referrer content including a reference to a referee system;
 causing communication of a user profile availability indication from the referrer system to the referee system to indicate availability of the user profile information for the user;
 receiving from the referee system a communication in response to the user profile availability indication, the communication indicating particular user profile information that is to be transmitted to the referee system;
 generating an extended universal resource locator (extended URL) based on the reference and including the particular user profile information indicated by the communication from the referee system; and
 transmitting the extended URL to the referee system in response to a selection of the reference by the user.

27. A method comprising:
 receiving from a referrer system a user profile availability indication that indicates availability of user profile information for a user to whom referrer content including a reference to a referee system is published,
 in an automated operation performed in response to the user profile availability indication and performed using one or more computer processor devices configured therefor, transmitting to the referrer system a communication indicating particular personal details from the user profile information that are to be transmitted to the referee system, and
 receiving from the referrer system an extended universal resource locator (extended URL) containing the particular personal details about the user, the referrer content including the extended URL of a referee system;
 extracting the particular personal details about the user from the extended URL;
 automatically adapting referee content based on the received particular personal details; and
 causing presentation of the adapted referee content to the user when the user accesses the referee system.

28. The method of claim 27, wherein the particular personal details include demographic information about the user.

29. A non-transitory machine-readable medium having stored thereon instructions executable by a machine to cause the machine to perform operations comprising:
 receiving from a referrer system a user profile availability indication that indicates availability of user profile information for a user to whom referrer content including a reference to a referee system is published,
 in response to the user profile availability indication, transmitting to the referrer system a communication indicating particular personal details from the user profile information that are to be transmitted to the referee system, and
 receiving from the referrer system an extended universal resource locator (extended URL) containing the particular personal details about the user, the referrer content including the extended URL of a referee system;
 extracting the particular personal details about the user from the extended URL;
 automatically adapting referee content based on the received particular personal details; and
 causing presentation of the adapted referee content to the user when the user accesses the referee system.

30. The machine-readable medium of claim 29, wherein the particular personal details include demographic information about the user.

\* \* \* \* \*